United States Patent
Yoo et al.

(10) Patent No.: US 8,495,345 B2
(45) Date of Patent: Jul. 23, 2013

(54) COMPUTING APPARATUS AND METHOD OF HANDLING INTERRUPT

(75) Inventors: Dong-hoon Yoo, Seoul (KR); Soo-jung Ryu, Cheonan-si (KR); Yeon-gon Cho, Hwaseong-si (KR); Bernhard Egger, Seoul (KR); Il-hyun Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 862 days.

(21) Appl. No.: 12/639,663

(22) Filed: Dec. 16, 2009

(65) Prior Publication Data
US 2010/0199076 A1 Aug. 5, 2010

(30) Foreign Application Priority Data
Feb. 3, 2009 (KR) .................. 10-2009-0008560

(51) Int. Cl.
*G06F 15/80* (2006.01)
(52) U.S. Cl.
USPC ........................................... 712/241; 712/10
(58) Field of Classification Search
None
See application file for complete search history.

(56) References Cited

U.S. PATENT DOCUMENTS

| | | | |
|---|---|---|---|
| 6,295,574 B1 | 9/2001 | MacDonald | |
| 2001/0039610 A1* | 11/2001 | Busa et al. | 712/225 |
| 2005/0021578 A1* | 1/2005 | Chen et al. | 708/230 |
| 2007/0162729 A1* | 7/2007 | Ryu et al. | 712/241 |
| 2007/0186085 A1* | 8/2007 | Yim et al. | 712/244 |
| 2008/0120493 A1* | 5/2008 | Yoo et al. | 712/225 |

FOREIGN PATENT DOCUMENTS

| | | |
|---|---|---|
| KR | 1020000031191 A | 6/2000 |
| KR | 1020000039582 A | 7/2000 |
| KR | 20030088892 B | 11/2003 |
| KR | 1020070080089 A | 8/2007 |
| WO | WO 02/063465 A2 | 8/2002 |

OTHER PUBLICATIONS

Mei,Bingfeng etal., Design Methology for a Tightly Coupled VLIW/Reconfigurable Matrix Architecture: A Case Study, 2004, IEEE, 6 pages.*
Bougard, Bruno etal., A Coarse-Grained Array Accelerator for Software-Defined Radio Baseband Processing, 2008, IEEE, 10 pages.*

* cited by examiner

*Primary Examiner* — Eric Coleman
(74) *Attorney, Agent, or Firm* — NSIP Law

(57) ABSTRACT

A computing apparatus and method of handling an interrupt are provided. The computing apparatus includes a coarse-grained array, a host processor, and an interrupt supervisor. When an interrupt occurs in the coarse-grained array while performing a loop operation, the host processor processes the interrupt, and the interrupt supervisor may perform mode switching between the coarse-grained array and the host processor.

11 Claims, 4 Drawing Sheets

COMPUTING APPARATUS AND METHOD OF HANDLING INTERRUPT

CROSS-REFERENCE TO RELATED APPLICATION

This application claims the benefit under 35 U.S.C. §119 (a) of a Korean Patent Application No. 10-2009-0008560, filed on Feb. 3, 2009, the entire disclosure of which is incorporated herein by reference for all purposes.

BACKGROUND

1. Field

The following description relates to a computing apparatus and method of handling an interrupt, and moreover, to a technique for handling an interrupt that occurs in the process of performing a loop operation in a reconfigurable array.

2. Description of the Related Art

Typically, a reconfigurable architecture denotes an architecture that enables a hardware constitution of a computing apparatus to be optimized for each task.

Reconfigurable architecture refers the ability of underlying hardware architectures or devices to alter the functionalities of its components and the interconnection between them to perform a desired task. Reconfigurable architecture includes, for example, a reconfigurable processor, a coarse-grained array, and the like.

A reconfigurable processor may be a microprocessor with erasable hardware that can rewire itself dynamically. This allows the processor to adapt effectively to the programming tasks demanded by a particular software that the processor is attempting to interface with at any given time. For example, a reconfigurable processor can transform itself to a video chip, a central processing unit (CPU), a graphics chip, and the like.

When a task is processed in a hardware manner, it is difficult to efficiently process the task even when the task is slightly changed due to the fixed functions of the hardware. When a task is processed in a software manner, it is possible to change the functions of the software to meet the task, however, the processing can often take a greater amount of time, and the processor often runs at less efficient speed.

The reconfigurable architecture may satisfy the advantages that the hardware/software have while at the same time alleviating some of the disadvantages. In particular, reconfigurable architecture may be used in the field of processing a digital signal, for example, in a process in which the same task is repeatedly performed.

The reconfigurable architecture includes various types as mentioned above, such as the reconfigurable processor and the coarse-grained array. The coarse-grained array may consist of a plurality of processing units. Controlling connections between the processing units enables the units to be optimized for tasks.

When an interrupt occurs in the process of performing a loop operation in a coarse-grained array, handling the interrupt may become an issue. The interrupt may include a hardware interrupt, for example, an external I/O device, a timer, and the like. The interrupt may include an exception, for example, an undefined instruction, and the like. The interrupt may include a software interrupt, for example, a system call, and the like. Typically, when an interrupt occurs, the current context stored in a register while processing the interrupt is saved. The context may be use to restore the loop operation.

Because the coarse-grained array includes a plurality of register files, a large amount of overhead for processing a generated interrupt is created.

SUMMARY

In one general aspect, there is provided a computing apparatus, including a coarse-grained array including a plurality of processing elements, a host processor formed outside of the coarse-grained array, a central register file transmitting data between the coarse-grained array and the host processor, and an interrupt supervisor which stalls an operation of the coarse-grained array when an interrupt occurs while a loop is executed in the coarse-grained array, and enables the host processor to process the interrupt.

The host processor may have one or more processing elements that operate independently from the processing elements of the coarse-grained array.

The coarse-grained array and the host processor may share the central register file and the coarse-grained array and the host processor may be tightly coupled together.

The interrupt supervisor may resume the operation of the coarse-grained array when the host processor completes the processing of the interrupt.

The interrupt supervisor may be configured with hardware.

The host processor may be a very long instruction word (VLIW) processor.

The coarse-grained array and the host processor may operate according to an instruction execution mode.

The instruction execution mode may include a general mode and an array mode, the host processor may operate in the general mode, and the coarse-grained array may operate in the array mode.

The interrupt supervisor may perform mode switching between the general mode and the array mode.

In another general aspect, there is provided a method of handling an interrupt, including determining whether an interrupt occurs while executing a loop in a coarse-grained array, the coarse-grained array including a plurality of processing elements, stalling an operation of the coarse-grained array when the interrupt occurs, and enabling a host processor to process the interrupt, the host processor including a plurality of processing elements independent from the plurality of processing elements of the coarse-grained array.

The method may further include resuming the operation of the coarse-grained array when the host processor completes the processing of the interrupt.

The coarse-grained array and the host processor may share a central register file and the coarse-grained array and the host processor may be tightly coupled together.

The coarse-grained array and the host processor may operate according to an instruction execution mode.

The instruction execution mode may include a general mode and an array mode, the host processor may operate in the general mode, and the coarse-grained array may operate in the array mode.

Other features and aspects will be apparent from the following detailed description, the drawings, and the claims.

Figure 1:
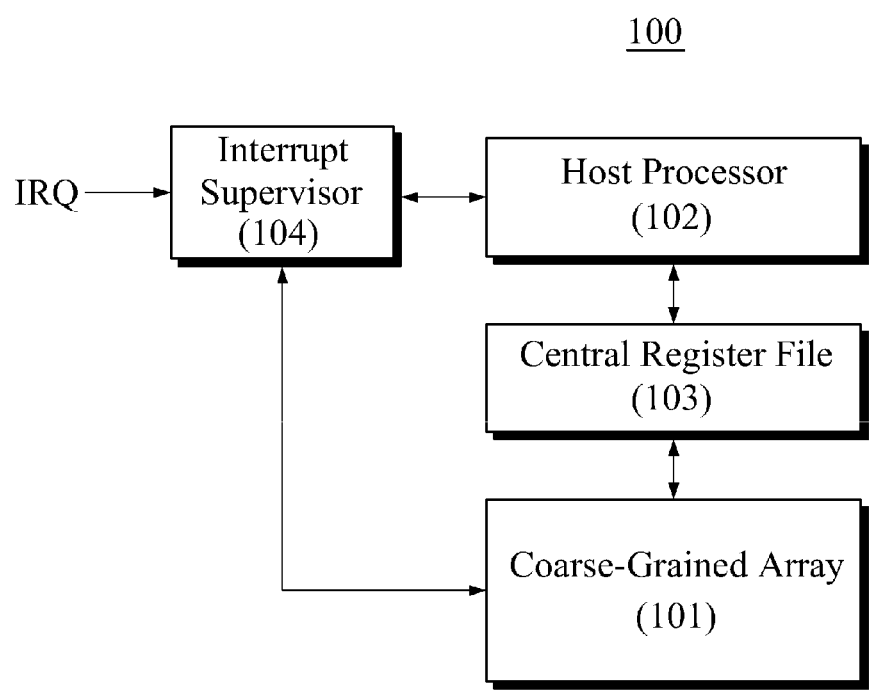
FIG. 1 is a block diagram illustrating an exemplary computing apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. Also, descriptions of well-known functions and constructions may be omitted for increased clarity and conciseness.

FIG. 1 illustrates an exemplary computing apparatus.

Referring to FIG. 1, a computing apparatus 100 includes a coarse-grained array 101, a host processor 102, a central register file 103, and an interrupt supervisor 104. The coarse-grained array 101 and the host processor 102 share the central register file 103 such that the coarse-grained array 101, the host processor 102, and the central register file 103 are coupled to each other. The interrupt supervisor 104 performs mode switching when an interrupt occurs.

The coarse-grained array 101 may be a reconfigurable processor. For example, the coarse-grained array 101 may include a plurality of processing elements, and may perform a customized calculation depending on connections between the processing elements.

The coarse-grained array 101 may be used to perform a loop operation, for example, a loop operation that repeatedly performs the same calculation. That is, the connection state of the processing elements included in the coarse-grained array 101 may be optimized for performing the calculation. For example, a loop-level parallelism may be utilized to simultaneously operate a plurality of processing elements, so that performance may be managed more efficiently.

The host processor 102 may be disposed outside of the coarse-grained array 101, and may perform a general operation other than the loop operation. For example, the host processor 102 may be a very long instruction word (VLIW) processor operating with processing elements independent from the processing elements of the coarse-grained array 101. In some embodiments, the host processor 102 and the coarse grained array 101 are disposed in the same structure.

The coarse-grained array 101 and the host processor 102 may share the central register file 103 and the coarse-grained array 101 and the host processor 102 may be tightly coupled together.

A tight coupling and loose coupling denote a manner in which data is transmitted between two or more processors. The tight coupling denotes a manner in which processors share a data register, and the loose coupling denotes a manner in which processors are connected to each other without such a data register. Loosely coupled modules are modules that are not very dependent on each other, and may use an interface to exchange parameter-less messages or events. Tightly coupled modules are modules that modify, rely, and/or share the internal workings of another module, for example, accessing local data of another module.

A typical example of the loose coupling may include a manner in which two processors are connected to each other through a data bus. In this example, to transmit data a processor may take control of a data bus and perform a command for transmitting data. Therefore, overhead may be generated while transmitting the data. In contrast, in the tight coupling, a processor may read or write data from or in the shared data register, and thus overhead that is generated while transmitting the data is reduced in comparison to the overhead generated with the loose coupling.

In an exemplary embodiment, the coarse-grained array 101 and the host processor 102 constitute a tight coupling structure, and the central register file 103 enables data transmission between them.

For example, after the coarse-grained array 101 performs a loop operation, the result of the operation is stored in the central register file 103. The host processor 102 reads the operation result stored in the central register file 103 to enable other operations following the loop operation to be performed.

In an exemplary embodiment, the computing apparatus 100 has a tight coupling structure and may support two execution modes. For example, the computing apparatus 100 may have a general mode and an array mode as instruction execution modes.

In some embodiments, only one of the coarse-grained array 101 and the host processor 102 may operate in each mode. For example, in the general mode, the host processor 102 may operate to perform a general operation, and in the array mode, the coarse-grained array 101 may operate to perform a loop operation. In some embodiments, both the coarse-grained array 101 and the host processor 102 may operate in each mode.

The interrupt supervisor 104 functions to switch the instruction execution mode. For example, the interrupt supervisor 104 consists of an individual hardware unit, and applies a control signal to the coarse-grained array 101 and a control signal to the host processor 102 to control operation states of both the coarse-grained array 101 and the host processor 102.

In some embodiments, the interrupt supervisor 104 may monitor whether an interrupt request is generated or not. When an interrupt request is generated while performing a loop operation in the coarse-grained array 101, the operation of the coarse-grained array 101 is stalled, and the interrupt request is transferred to the host processor 102 so that the interrupt can be handled.

After the interrupt is processed by the host processor 102, the coarse-grained array 101 may resume the operation.

In the non-limiting example described above, the host processor 102 includes processing elements that operate separately from the processing elements that the coarse-grained array 101 includes, and the host processor 102 is tightly coupled to the coarse-grained array 101. In this example, a delay such as context saving, or the storing of a context switch, may be reduced when a mode is switched for interrupt handling. In a context switch, the state of the first process must be saved so that when the scheduler gets back to the execution of the first process, it can restore the state and continue. The state of the process may include the registers that the process is using, for example, the program counter, plus any other operating system data that may be beneficial. This data may be stored in a data structure called a process control block (PCB), or switchframe.

Figure 2:
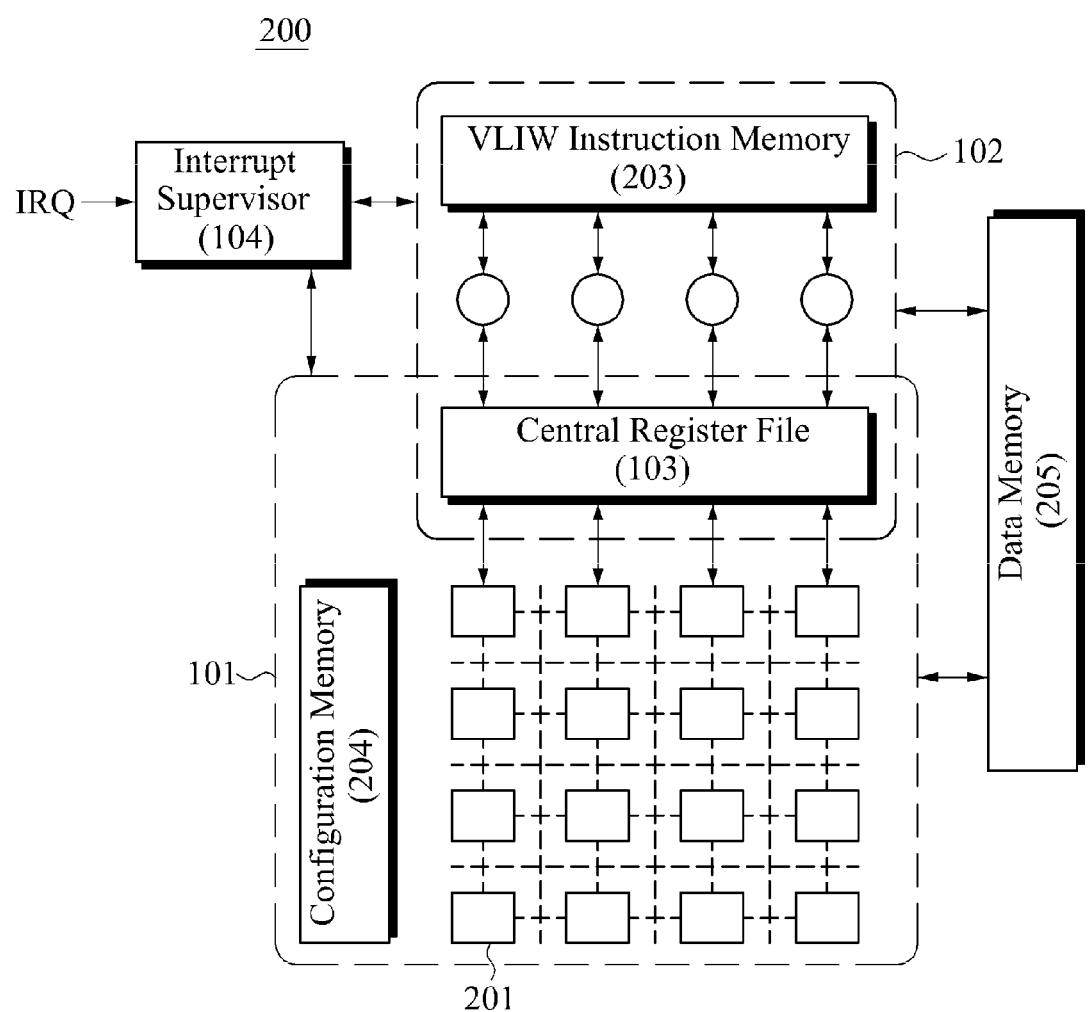
FIG. 2 is a diagram illustrating another exemplary computing apparatus.

FIG. 2 illustrates another exemplary computing apparatus.

Referring to FIG. 2, the exemplary computing apparatus 200, as illustrated in FIG. 1, may include a coarse-grained array 101, a host processor 102, a central register file 103, and an interrupt supervisor 104.

The coarse-grained array 101 consists of one or more processing elements 201, for example, two, four, eight, twelve, sixteen, twenty, or other desired amount of processing elements 201. In the non-limiting example illustrated in FIG. 2, sixteen processing elements 201 are connected to each other. Connection states between the processing elements 201 may be changed depending on a selection of data stored in a configuration memory 204. Also, each processing element 201 may include a function unit and/or a register file. Therefore, the coarse-grained array 101 may be used to adjust the configuration of the configuration memory 204 to be further optimized for performing one or more repeated calculations, and for performing a loop operation.

The host processor 102 and the coarse-grained array 101 share the central register file 103, and the host processor 102 has one or more processing elements 202 separated from the processing elements 201 of the coarse-grained array 101. For example, the host processor 102 may have, two, four, eight, twelve, sixteen, twenty, or other desired amount of processing elements 202.

For example, the host processor 102 has four processing elements 202, and may constitute a VLIW architecture. In the VLIW architecture, a plurality of instructions that may be processed in a parallel manner are included in an instruction word, and the respective processing elements 202 may process such instructions in a parallel manner. The host processor 102 may include a VLIW instruction memory 203 that fetches an instruction from a data memory 205 and decodes the instruction.

When an interrupt request is generated while performing a loop operation in the coarse-grained array 101, the interrupt supervisor 104 may stall the operation of the coarse-grained array 101 and operate the host processor 102 to process the interrupt request.

Because the processing elements 202 of the host processor 102 operate independently from the processing elements 201 of the coarse-grained array 101, when an interrupt request is generated, the host processor 102 may process the request as described above.

Figure 3:
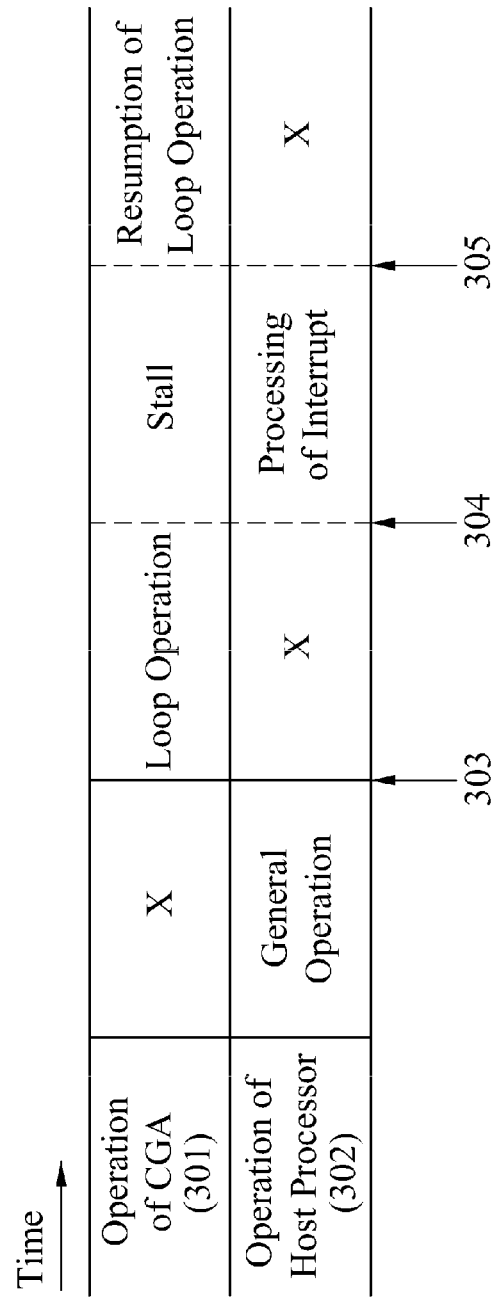
FIG. 3 is a diagram for explaining an exemplary process of a computing apparatus.

FIG. 3 illustrates an exemplary process of a computing apparatus.

In FIG. 3, 301 represents an operation of a coarse-grained array 101, and 302 represents an operation of a host processor 102. Each of 303, 304, and 305 represents a point of time at which an operation is switched.

In the non-limiting example illustrated in FIG. 3, the coarse-grained array 101 and the host processor 102 are tightly coupled and do not simultaneously operate. For example, a general operation may be performed in the host processor 102, and a loop operation may be performed in the coarse-grained array 101.

In this example, the general operation is performed in the host processor 102. At the time point 303, the loop operation begins, and the coarse-grained array 101 starts to operate. A switching from the general operation to the loop operation may be performed by the interrupt supervisor 104 or a software command.

After the switch the loop operation is performed in the coarse-grained array 101. At the time point 304, an interrupt occurs. At this time, the interrupt supervisor 104 stalls the operation of the coarse-grained array 101, and transfers the corresponding interrupt request to the host processor 102. Then, the host processor 102 performs interrupt handling. At the time point 305, the interrupt handling is completed, and the interrupt supervisor 104 operates the stalled coarse-grained array 101 to resume the loop operation.

As described above, to stall or resume the loop operation for handling an interrupt, operations of the coarse-grained array 101 or the host processor 102 may be controlled without a separate process such as context saving or context switching, and the interrupt may be processed.

Figure 4:
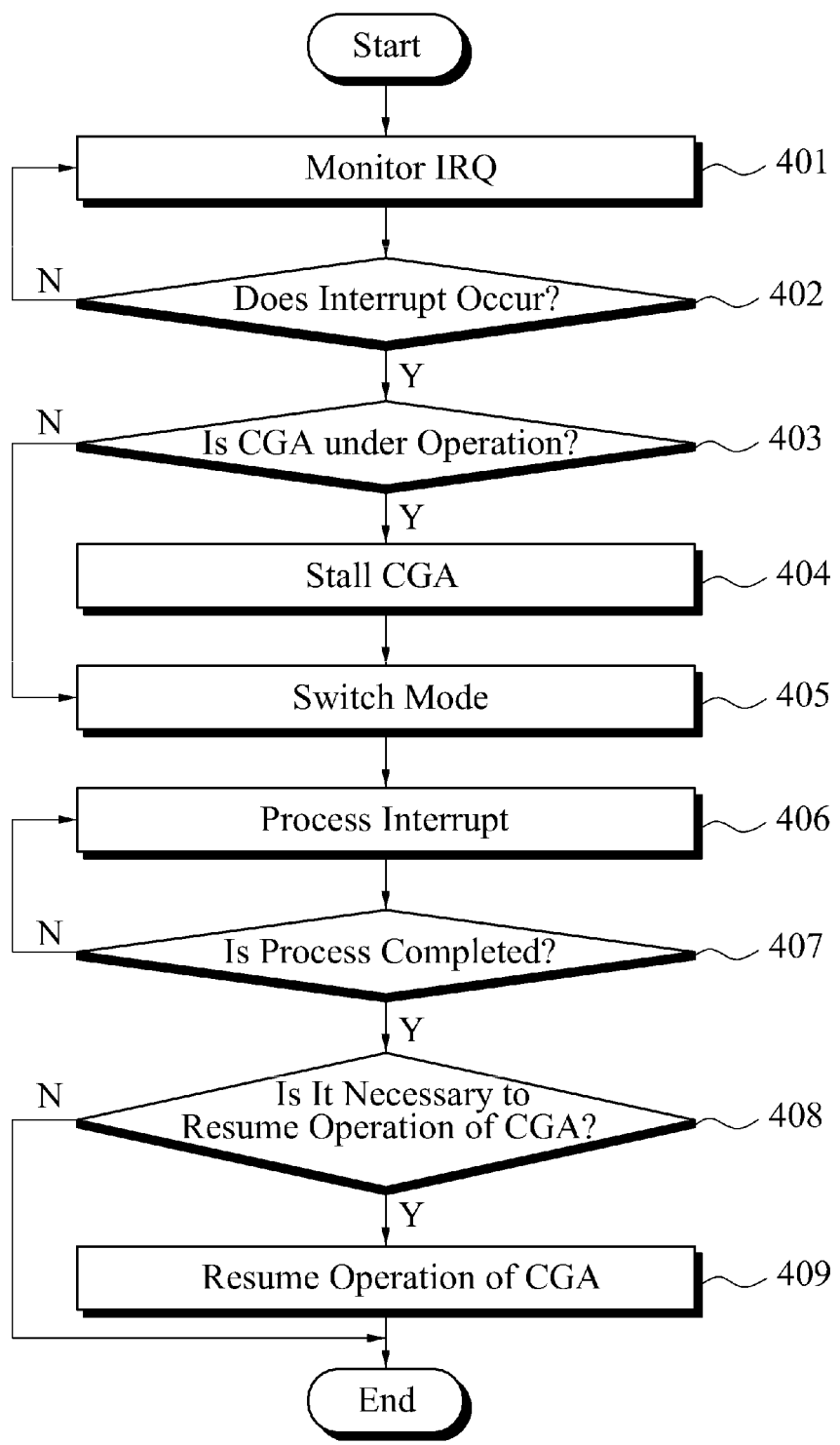
FIG. 4 is a flowchart illustrating an exemplary method of handling an interrupt.

FIG. 4 illustrates a method of handling an interrupt. This method of handling an interrupt may be performed in the exemplary computing apparatuses illustrated in FIGS. 1 and/or 2.

An interrupt supervisor 104 monitors whether or not an interrupt request (IRQ) is externally made in 401.

When the interrupt supervisor 104 determines that an interrupt request has been generated in 402, the interrupt supervisor 104 determines whether a coarse-grained array 101 is under operation in 403.

When the coarse-grained array 101 is under operation, the interrupt supervisor 104 stalls an operation of the coarse-grained array 101 in 404, and performs mode switching in 405. Here, the mode switching may be switching from an array mode, in which the coarse-grained array 101 operates, to a general mode, in which a host processor 102 operates.

Sequentially, the host processor 102 processes the interrupt request in 406. For example, the interrupt supervisor 104 may transfer the interrupt request to the coarse-grained array 101 and give a control command to process the interrupt request.

Afterwards, the interrupt supervisor 104 determines whether the coarse-grained array 101 completes processing of the interrupt request in 407.

When processing of the interrupt request is completed, the interrupt supervisor 104 determines whether it is necessary to resume the operation of the coarse-grained array 101 in 408. For example, when it is determined in 403 that the coarse-grained array 101 is not under operation, the operation does not need to be resumed, but when it is determined that the coarse-grained array 101 is under operation, the operation may be resumed.

When the operation of the coarse-grained array 101 is to be resumed, the interrupt supervisor 104 resumes the operation of the coarse-grained array 101 in 409. Then, the coarse-grained array 101 performs the operation that was being performed before the interrupt request was generated.

As apparent from the above description, according to the exemplary embodiment, the coarse-grained array 101 is tightly coupled to the host processor 102, and the host processor 102 independently operates from the coarse-grained array 101. Thus, an interrupt may be processed without increased overhead such as context saving.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A computing apparatus or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing apparatus or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A computing apparatus, comprising:
    a coarse-grained array including a plurality of reconfigurable processing elements having connections that are capable of being reconfigured for processing;
    a host processor comprising one or more processing elements that operate independently from the plurality of reconfigurable processing elements of the coarse-grained array and which are formed outside of the coarse-grained array;
    a central register file transmitting data between the coarse-grained array and the host processor; and
    an interrupt supervisor which stalls an operation of the coarse-grained array when an interrupt occurs while a loop is executed in the coarse-grained array, and enables the host processor to process the interrupt,
    wherein the coarse-grained array and the host processor are tightly coupled together by sharing the central register file.

2. The apparatus of claim 1, wherein the interrupt supervisor resumes the operation of the coarse-grained array when the host processor completes the processing of the interrupt.

3. The apparatus of claim 1, wherein the interrupt supervisor is configured with hardware.

4. The apparatus of claim 1, wherein the host processor is a very long instruction word (VLIW) processor.

5. The apparatus of claim 1, wherein the coarse-grained array and the host processor operate according to an instruction execution mode.

6. The apparatus of claim 5, wherein the instruction execution mode includes a general mode and an array mode, the host processor operates in the general mode, and the coarse-grained array operates in the array mode.

7. The apparatus of claim 6, wherein the interrupt supervisor performs mode switching between the general mode and the array mode.

8. A method of handling an interrupt, comprising:
    determining whether an interrupt occurs while executing a loop in a coarse-grained array, the coarse-grained array including a plurality of reconfigurable processing elements having connections that are capable of being reconfigured for processing;
    stalling an operation of the coarse-grained array when the interrupt occurs; and
    enabling a host processor to process the interrupt, the host processor comprising one or more processing elements that operate independently from the plurality of reconfigurable processing elements of the coarse-grained array, and which are formed outside of the coarse-grained array,
    wherein the coarse-grained array and the host processor are tightly coupled together by sharing the central register file.

9. The method of claim 8, further comprising resuming the operation of the coarse-grained array when the host processor completes the processing of the interrupt.

10. The method of claim 8, wherein the coarse-grained array and the host processor operate according to an instruction execution mode.

11. The method of claim 10, wherein the instruction execution mode includes a general mode and an array mode, the host processor operates in the general mode, and the coarse-grained array operates in the array mode.

* * * * *